United States Patent [19]

Iwaki et al.

[11] 4,384,225
[45] May 17, 1983

[54] CHARGING GENERATOR FOR MOTOR VEHICLE

[75] Inventors: Yoshiyuki Iwaki, Himeji; Hitoshi Goto, Kakogawa, both of Japan

[73] Assignee: Mitsubishi Denki Kabushiki Kaisha, Tokyo, Japan

[21] Appl. No.: 281,507

[22] Filed: Jul. 8, 1981

[30] Foreign Application Priority Data

Jul. 10, 1980 [JP] Japan ............................. 55-97795[U]

[51] Int. Cl.³ ............................................. H02K 5/10
[52] U.S. Cl. ...................................... 310/88; 310/239
[58] Field of Search ............... 310/238, 239, 232, 228, 310/241, 242, 88, 263, 680, 43, 45, 233, 219; 277/59; 361/394, 427

[56] References Cited

U.S. PATENT DOCUMENTS

| | | | |
|---|---|---|---|
| 2,285,970 | 6/1942 | Hempill | 310/239 |
| 2,744,206 | 5/1956 | Hansen | 310/228 |
| 3,233,130 | 2/1966 | Bates | 310/88 |
| 3,731,126 | 5/1973 | Hagenlocher | 310/239 |

FOREIGN PATENT DOCUMENTS

| | | | |
|---|---|---|---|
| 1082976 | 12/1955 | Fed. Rep. of Germany | 310/239 |
| 55-68844 | 5/1980 | Japan | 310/239 |

*Primary Examiner*—R. Skudy
*Attorney, Agent, or Firm*—Wenderoth, Lind & Ponack

[57] ABSTRACT

A charging generator has two slip rings surrounded by a cylindrical cover provided on the periphery with an axially extending opening, a brush holder including one end portion inserted into the opening and slightly spaced from each edge of the opening and two spring loaded brushes held in the holder to contact slidably the slip rings. The cover includes a protrusion located adjacent to each edge of the opening so as to extend substantially radially outwardly and the brush holder includes two opposite protrusions extending along adjacent portions of the outer cover periphery and toward the adjacent protrusions of the cover to form labyrinths between them. The labyrinths are filled with a grease.

5 Claims, 8 Drawing Figures

CHARGING GENERATOR FOR MOTOR VEHICLE

BACKGROUND OF THE INVENTION

This invention relates to a charging generator for a motor vehicle, and more particularly to improvements in a sealing structure disposed around a brush holder and associated slip rings included in such a generator.

A conventional sealing structure of the type referred to has comprised a cylindrical cover extending axially inwardly of a charging generator from a rear bracket thereof, at least two slip rings disposed coaxially within the cover, and a brush holder including one end portion inserted into an axial opening disposed in the cover to form a narrow gap between the same and the adjacent side wall of the opening and at least two spring loaded brushes housed in the brush holder to slidably contact the slip ring respectively. The brush holder has included a pair of protrusions running along the outer periphery of the cover to form therebetween another narrow gap which communicates with the firstmentioned narrow gap to form a labyrinth between the brush holder and the cover whereby muddy water and dirt are prevented from entering the interior of the cover.

Lately salt is frequently sprinkled on roads to prevent the roads from freezing. The resulting brine has entered the inside of the cover through the abovementioned labyrinth. This has meant that conventional sealing structures such as described above do not have a satisfactory sealing function.

Accordingly it is an object of the present invention to provide a charging generator for a motor vehicle having an improved sealing structure constructed at an extremely low cost.

SUMMARY OF THE INVENTION

The present invention provides a charging generator for a motor vehicle comprising a slip ring, a cylindrical cover provided on a circumferential surface thereof with an axially extending opening and covering the outer periphery of the slip ring, a brush holder for holding slidably a brush therein, the brush holder having a free end inserted into the opening so as to be slightly spaced from both side walls of the opening so that the brush slidably contacts the slip ring, the cover and the brush holder being provided on opposite portions thereof with respective protrusions to form therebetween a labyrinth opening on each side of the brush holder and the labyrinth being filled with a sealing material.

The protrusion on the brush holder may be provided on its surface opposite to the outer periphery of the cover with a multitude of pointed parallel projections running axially of the cover.

BRIEF DESCRIPTION OF THE DRAWINGS

The present invention will become more readily apparent from the following detailed description taken in conjunction with the accompanying drawings in which.

Throughout the Figures like reference numerals designate identical or corresponding components.

DESCRIPTION OF THE PREFERRED EMBODIMENTS

Figure 1:
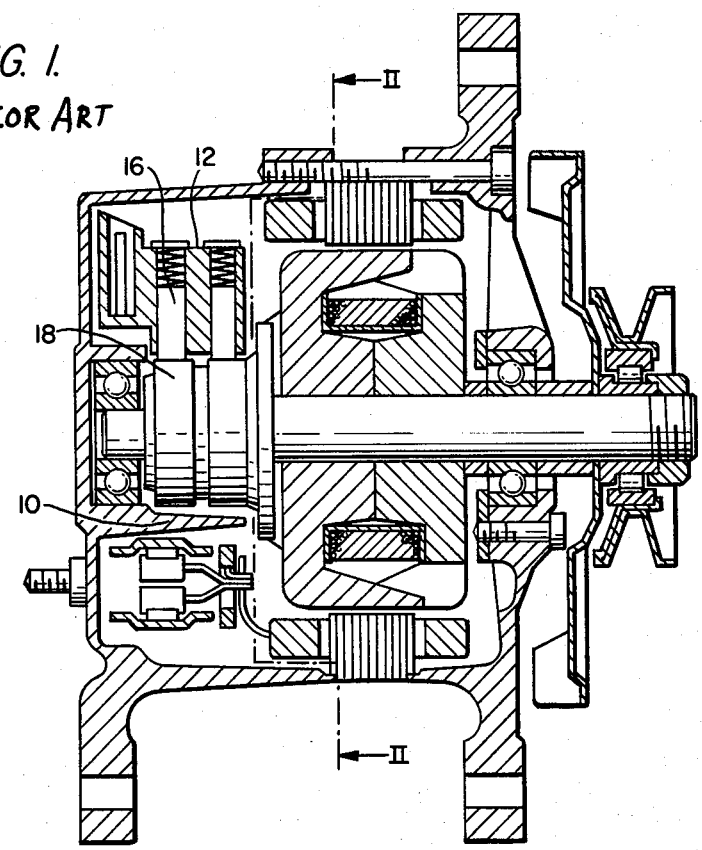
FIG. 1 is a longitudinal sectional view of a conventional charging generator for a motor vehicle.

Referring now to FIG. 1 of the drawings, there is illustrated a conventional charging generator for a motor vehicle. The arrangement illustrated comprises a cylindrical cover 10 forming a part of a rear bracket included in the charging generator and including an opening 10a (see FIGS. 2 and 3) extending axially on the circumferential surface thereof, and a brush holder 12 including one end portion inserted into the opening 10a to form a narrow gap between each side of the same and the adjacent side wall of the opening 10a, and a pair of opposite protrusions 14 extending generally parallel to the outer periphery of the cover 10 adjacent to the opening 10a and spaced radially outwardly from the inner end of the brush holder 12 to form narrow gaps therebetween. A pair of spring loaded brushes 16 are shown in FIG. 1 as being housed in the brush holder 12 so as to be slidable radially inwardly and include free ends extending into the cover 10 until the free ends are slidably engaged with by respective slip rings 18. The slip rings 18 are covered in spaced relationship with the cover 10 as shown in FIG. 3.

Figure 2:
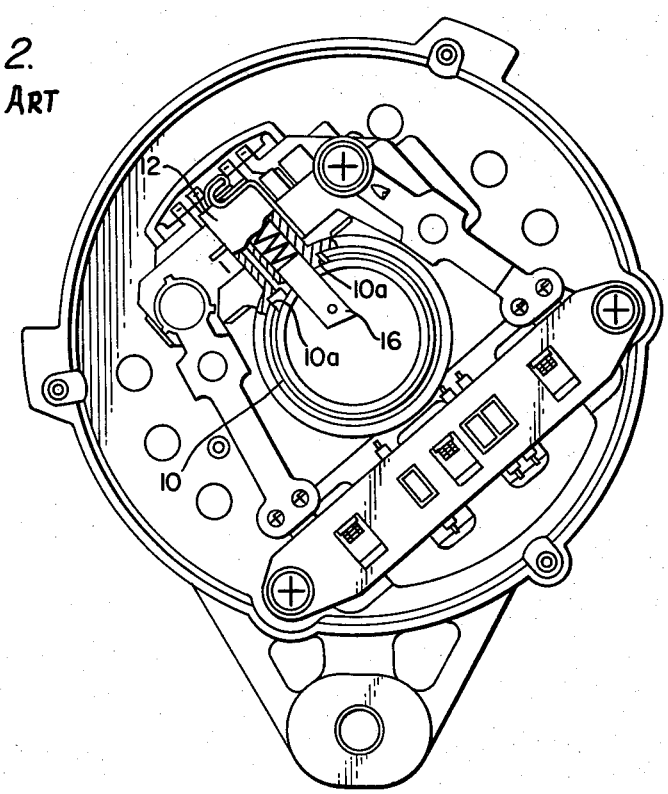
FIG. 2 is a plan view of the rear bracket portion shown in FIG. 1 as viewed on the line II—II of FIG. 1 and in the direction of the arrows and omitting the rotary shaft and bearing shown in FIG. 1.

While FIGS. 1 and 2 show other components without the reference numerals, they form no part of the present invention and need not be described.

Figure 3:
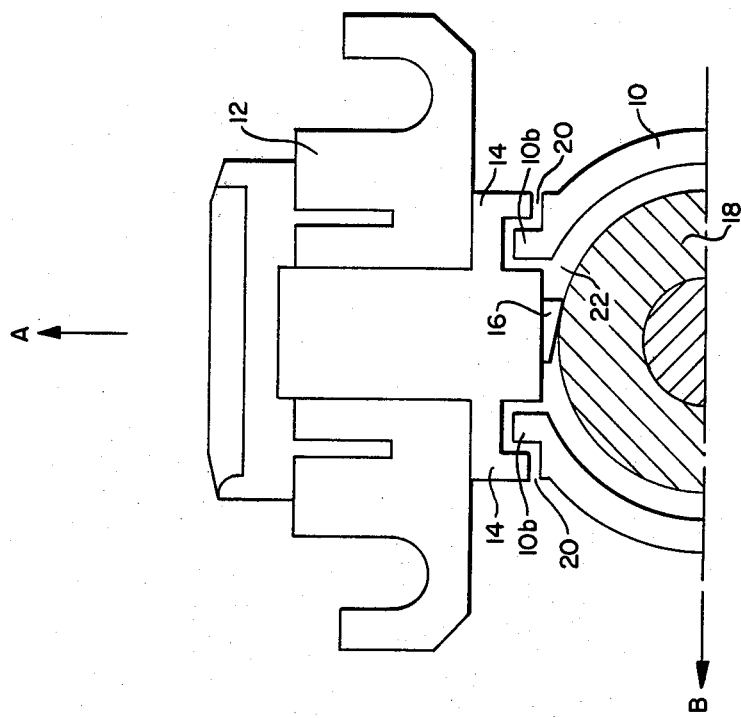
FIG. 3 a fragmental elevational view on an enlarged scale of the sealing structure disposed between the brush holder and cover shown in FIGS. 1 and 2 with parts illustrated in cross section.

As shown in FIG. 3, the abovementioned narrow gaps on each side of the brush holder 12 communicate with each other to form a substantially L-shaped labyrinth 20 for preventing brine, muddy water, dust etc. from entering the inside of the cover 10. When the arrangement of FIG. 3 is located so that the arrow A shown in FIG. 3 points upwardly in the vertical direction, the pair of protrusion 14 effectively performed the labyrinthine operation. However if either of the arrows B shown in FIG. 3 points upwardly in a vertical direction due to an orientation of the generator equipped on an associated motor car then there has occurred an objection that brine and others enter the inside of the cover 10 through the labyrinth 20 until the brushes 16 are stuck to the respective slip rings 18.

Figure 4:
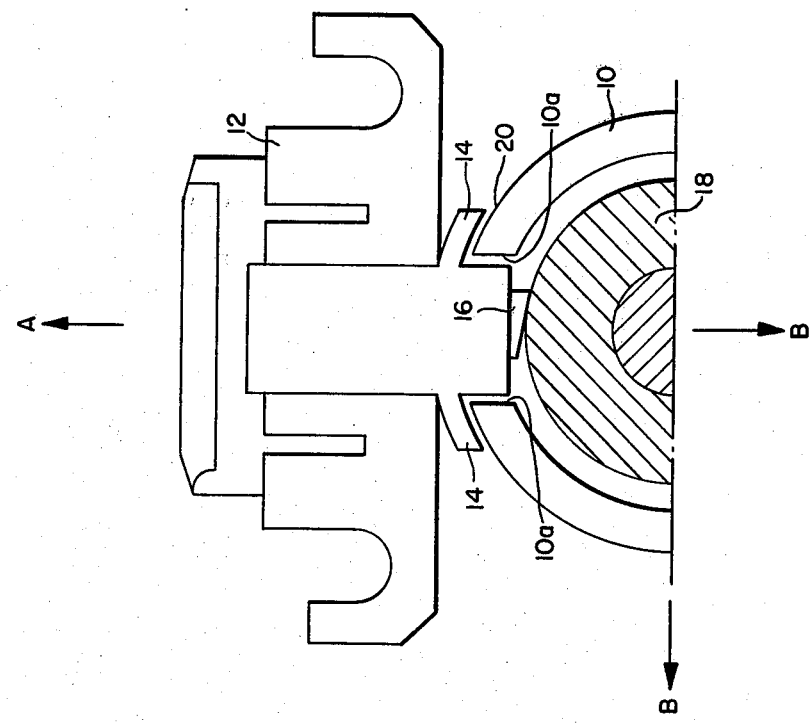
FIG. 4 is a view similar to FIG. 3 but illustrating a modification of the arrangement shown in FIG. 3.

In order to enhance the labyrinthine effect, the arrangement of FIG. 3 might be modified substantially as shown in FIG. 4. The arrangement illustrated is different from that shown in FIG. 3 only in that in FIG. 4, the cover 10 and the brush holder 12 are on the opposite end portions thereof with respective protrusions. More specifically, the cover 10 is provided at each edge of the opening 10a with a rectangular protrusion 10b extending substantially radially outwardly and consecutive to the outer periphery of the cover 10 through a shoulder. On the other hand, the brush holder 12 includes a pair of protrusions 14 in the form of L's each having one leg perpendicular to the longitudinal axis thereof and the other leg running in spaced parallel relationship with the protrusion 10b of the cover 10 and terminating short of the shoulder thereof. Thus the L-shaped protrusion 14 embrace the protrusion 10b to form a labyrinth 20 between the adjacent portions of the cover and brush holder 10 and 12 respectively. The labyrinth 20 shown in FIG. 4 is more complicated in shape than that illustrated in FIG. 3.

When the arrangement of FIG. 4 is located so that the arrow A shown in FIG. 4 points upwardly in a vertical direction, no problem is offered as that shown in FIG. 3. However if the arrow B shown in FIG. 4 points upwardly in the vertical direction then the arrangement is disadvantageous in that brine and other material enter the inside of the cover 10 through either one or both of the labyrinths 20 formed between the protrusion 14 of the brush holder 12 and the protrusion 10b of the cover 10 until the brushes 16 are stuck to the mating slip rings 18 respectively.

In order to eliminate this disadvantage it has been proposed to fill the labyrinths 20 between the cover and the brush holder 14 with a rubber packing, a gasket or the like. This measure, however, has been disadvantageous in that the filling operation is troublesome resulting in an extremely high cost.

The present invention contemplates eliminating the disadvantages of the prior art practice as described above by the provision of a charging generator for a motor vehicle having an improved sealing ability with an extremely inexpensive construction.

Figure 5:
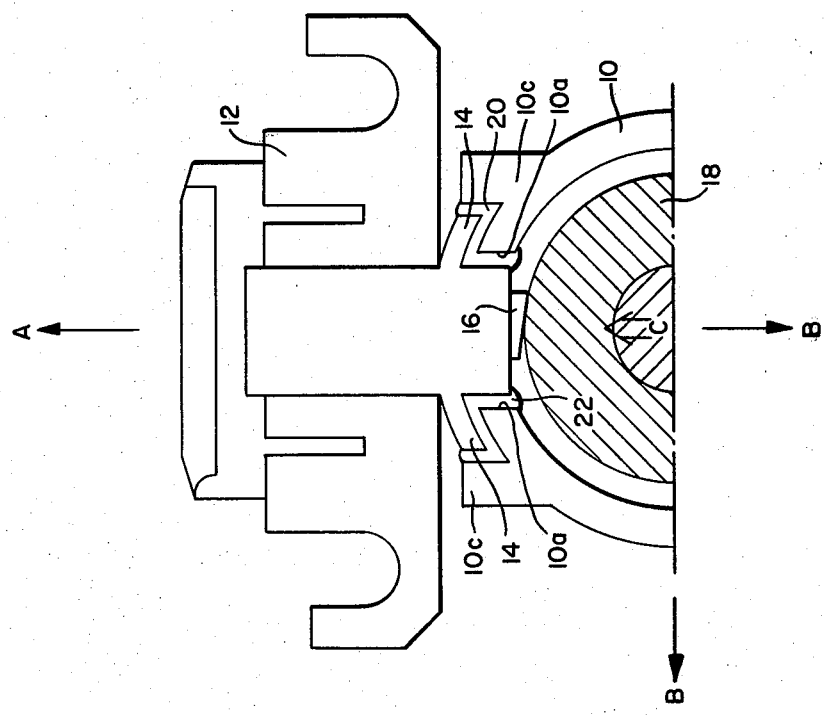
FIG. 5 is a fragmental elevational view of one embodiment of the sealing structure of the present invention disposed around brush holder included in a charging generator for a motor vehicle with parts illustrated in cross section.
Figure 6:
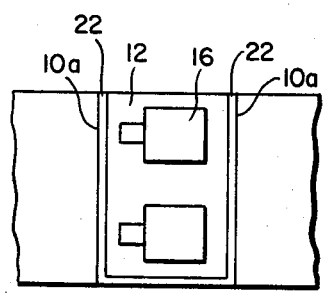
FIG. 6 is a fragmental plan view as viewed in the direction of the arrow C shown in FIG. 5 and omitting the slip ring shown in FIG. 5.

Referring now to FIGS. 5 and 6, there is illustrated one embodiment of the sealing structure of the present invention. The arrangement illustrated is different from that shown in FIG. 3 only in that in FIGS. 5 and 6, a substantially Z-shaped labyrinth is formed between the opposite portions of the cover and brush holder 10 and 12 respectively on each side of the brush holder 12 which opens on the side of the brush holder 12 and filled with a suitable sealing material.

More specifically, the cover 10 is provided adjacent to each of the opposite edges of the opening 10a with a protrusion 10c extending substantially radially outwardly parallel to the longitudinal axis of the brush holder 12 thereby to form a generally radially outwardly facing recess between the protrusion 10c and that portion of the outer periphery of the cover 10 located between the protrusion 10c and the adjacent edge of the opening 10a. Disposed in that recess is an associated one of the protrusions 14 extending from the brush holder 12 in the same manner as described above in conjunction with FIG. 3. Thus a substantially Z-shaped labyrinth 20 is formed between the opposite portions of the cover and brush holder 10 and 12 respectively on each side of the latter and opens toward the brush holder 12. The labyrinth 20 is filled with a sealing material 22, in this case, a grease 22.

Since the labyrinth 20 is filled with the grease 22, brine, muddy water, dirt etc. are effectively prevented from entering the inside of the cover 10. Also because of its hydrophobic property, the grease prevents the penetration of water and also can extremely effectively prevent the penetration of brine. Further even if the arrangement of FIG. 5 is located so that the arrow B shown in FIG. 5 points upwardly in a vertical direction, the protrusion 10c makes it difficult for brine, muddy water, dirt etc. to enter into the labyrinth 20. Further even through brine and other material reach the proximity of the labyrinth 20, the grease 22 prevents them from entering the inside of the cover 10.

Figure 7:
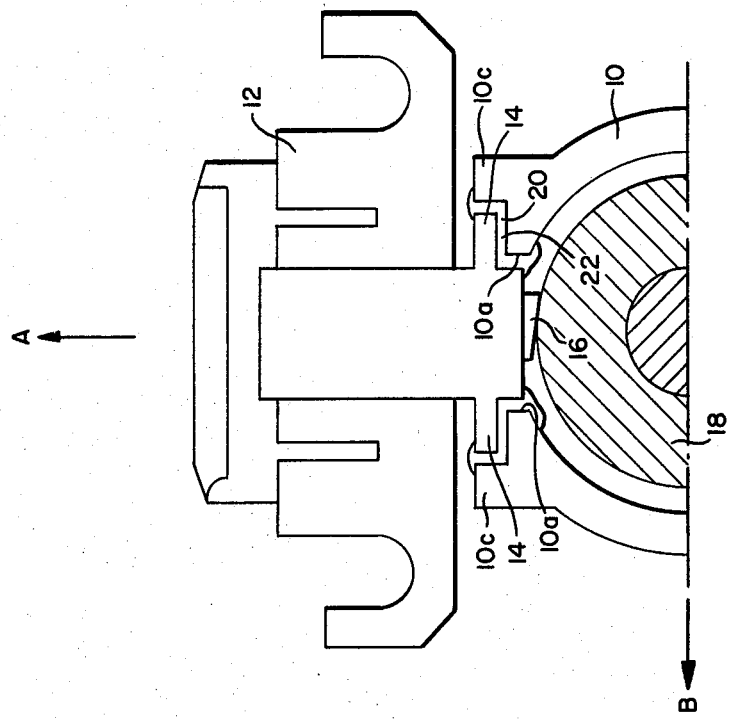
FIG. 7 is a view similar to FIG. 5 but illustrating a modification of the present invention.

The arrangement illustrated in FIG. 7 is different from that shown in FIG. 5 only in that in FIG. 7 the brush holder 12 has each of the protrusions 14 extending perpendicularly to the longitudinal axis thereof and the cover 10 has an outer flat periphery parallel to the protrusion 14 between each edge of the opening 10a and the adjacent rectangular protrusion 10c. Thus a substantially L-shaped narrow gap is formed between the protrusion 14 of the brush holder 12 and the adjacent portion of the cover 10 on each side of the brush holder 14. As in the arrangement shown in FIGS. 5 and 6, the L-shaped narrow gap communicates with the narrow gap formed between each side wall of the opening 10a and the adjacent surface of the brush holder 12 to form the labyrinth 20.

Figure 8:
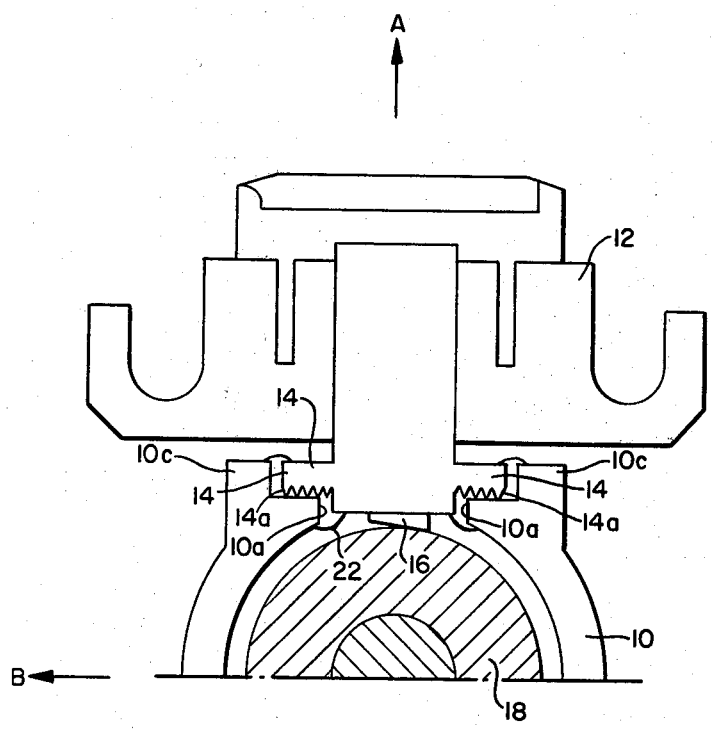
FIG. 8 is a view similar to FIG. 5 but illustrating another modification of the present invention.

The arrangement illustrated in FIG. 8 is different from that shown in FIG. 5 only in that in FIG. 8 each of the protrusions 14 is provided on the radially inwardly facing surface thereof opposite to the outer flat periphery of the cover with a plurality of pointed parallel projections 14a extending generally radially inwardly of the cover 10 and opposite to the outer flat periphery of the cover 10. While the projections 14a are shown in FIG. 8 as being substantially in contact with by the outer flat periphery of the cover 10 it is to be understood that the same need not be in contact, but can be slightly spaced therefrom. This measure can increase the property of the grease 20 to be retained within the labyrinth 22.

The labyrinth 20 shown in each of FIGS. 5, 7 and 8 may be filled with a sealing material consisting essentially of a silicone resin or in adhesive consisting essentially of an epoxy resin in place of the grease.

From the foregoing it is seen that, according to the present invention, a cover and a brush holder include respective protrusions disposed on the opposite portions thereof to form therebetween a labyrinth which is, in turn, filled with a sealing material. Therefore brine, muddy water, dirt etc. can be extremely simply prevented from entering the interior of the cover without using either a packing or a gasket which are expensive. This results in the elimination of an objection that brushes involved stick to mating slip rings respectively and also in the advantages that the labyrinth is automatically filled with the sealing material.

While the present invention has been illustrated and described in conjunction with a few preferred embodiments thereof it is to be understood that numerous changes and modifications may be resorted to without departing from the spirit and scope of the present invention.

What is claimed is:

1. A charging generator for a motor vehicle comprising a slip ring, a cylindrical cover provided on the circumferential surface thereof and having an axially extending opening thereon, and covering an outer periphery of said slip ring, a brush holder for slidably holding a brush therein, said brush holder having one end inserted into said opening and slightly spaced from both side walls of said opening with said brush slidably contacting said slip ring, said cover and said brush holder having on opposed portions thereof protrusions forming therebetween a labyrinth on each side of said brush holder, and a sealing material filling said labyrinth, said sealing material being a sealing material taken from the group consisting of grease, silicone resin and epoxy resin.

2. A charging generator as claimed in claim 1 in which said protrusions on said cover are two protrusions spaced around the circumference of said casing from the opposite edges of said opening, said cover protrusions extending generally parallel to the brush holder and defining generally outwardly facing recesses between said cover protrusions and said opening, said protrusions on said brush holder extending generally parallel to the outer surface of said cover and spaced radially outwardly from the inner end of the brush holder and fitting into said recesses.

3. A charging generator as claimed in claim 2 wherein said protrusion on said brush holder has on the radially inwardly facing surface thereof a plurality of pointed parallel projections extending generally radially inwardly.

4. A charging generator as claimed in claim 3 wherein said plurality of pointed parallel projections contact said cover.

5. A charging generator as claimed in claim 3 wherein said plurality of pointed parallel projections are slightly spaced from said cover.

* * * * *